Aug. 13, 1957     C. E. OTTAWAY     2,802,350

UNIVERSAL JOINT COUPLER

Filed Dec. 2, 1955

INVENTOR.
CHARLES E. OTTAWAY
BY

ATTORNEYS

United States Patent Office 2,802,350
Patented Aug. 13, 1957

2,802,350

UNIVERSAL JOINT COUPLER

Charles E. Ottaway, Robins, Iowa, assignor to Collins Radio Company, Cedar Rapids, Iowa, a corporation of Iowa Application December 2, 1955, Serial No. 550,516

4 Claims. (Cl. 64—15)

This invention relates to shaft couplers and more particularly to a universal joint coupler having low backlash.

Prior devices in this field have involved using an intermediate body for transmitting rotation from one shaft to another with flexible coupling means therebetween. Many of the versions of the prior art suffered from the disability of having backlash and, in the case of forms utilizing rubber or other elastic media, also suffered from a loading deflection which destroyed position precision. Many of the devices introduced striction and non-linearity of motion transfer as a result of the numerous parts involved between one shaft and the other.

This coupler is intended for the field where a small torque is to be transmitted with virtually no backlash and as low a striction and other disabilities as possible.

Accordingly, it is an object of this invention to produce a shaft coupler which will allow misalignment of the shafts coupled and yet transmit small torques with a high degree of precision.

A feature of the device is that it is simple and relatively easy to make. Another feature is that the device may be used as an electrical insulation means between two shafts as well as a means for transmitting rotary motion without backlash. A further feature is the effect of the springs in the coupling whereby it acts somewhat as a torque limiting device.

Further objects, features, and advantages of the invention will become apparent from the following description and claims when read in conjunction with the drawing, in which;

Figure 1:
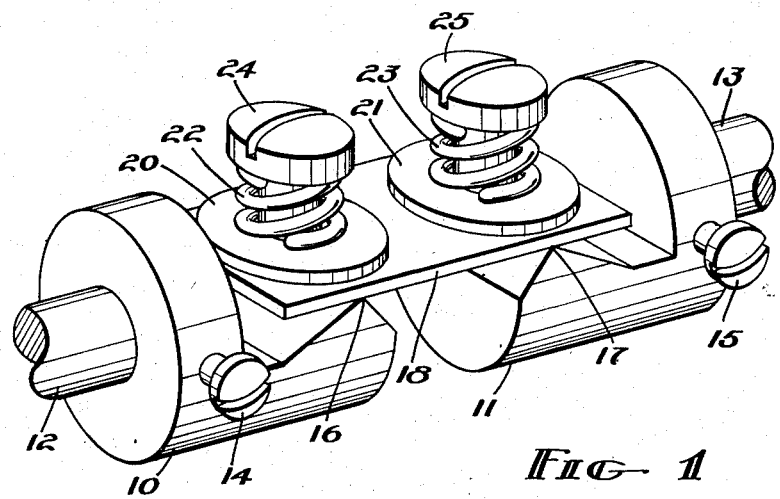
Figure 1 shows a perspective drawing of an assembled coupler according to the invention.

In Figure 1 the coupler is shown with the shafts in alignment. The coupler consists of hubs 10 and 11 carried by shafts 12 and 13, respectively. The hubs are retained on the shafts by any of the usual means for attaching hubs or pulleys to shafts. Set screws 14 and 15 are shown here. On each hub an edge is formed which is shown approximately in the plane of the axis of that shaft and transverse thereto. Edge 16 is formed on hub 10 as the edge of a prismatic portion extending laterally from an elongated portion of the hub; edge 17 is similarly formed on hub 11. The shape of the prism below the edge is not too important except that it must be sloping away from the edge at an angle great enough to clear the coupling plate 18 under the most extreme misalignment of the shafts coupled. The edge should be perpendicular to the axis of rotation but may be at any distance radially from the axis, it being obvious that the farther a radial spacing, the greater the torque that will be transmitted for a certain spring pressure of the coupling springs.

Transfer plate 18 is of a rigid material. That is to say, it must be rigid enough not to deflect under the torsional stresses applied to it. Coupling plate 18 may be made of any material satisfying these requirements and satisfying any other additional requirements desired such as strength, corrosion resistance, or electrical qualities. If plate 18 is made of any one of the well known ceramic materials used in electrical work, the requirement of rigidity can be satisfied and a further feature is made possible, of electrical insulation between hubs 10 and 11. Rounding of the corners and edges except for the coupling edges 16 and 17 of the hubs 10 and 11 and of the washer edges 20 and 21 will permit the device to withstand considerable high voltage potentials from one hub to the other. The insulation material used in bar 18 would then be under a lower electrostatic stress in this arrangement than the air between the ends of the hubs or between the washers.

Plate 18 is held against edges 16 and 17 by the force of springs 22 and 23. Screw means 24 and 25 are shown here holding springs 22 and 23, but any well known means such as rivets, stud and nut, etc., may be used as desired. Springs 22 and 23 bear against plates 20 and 21. Plates 20 and 21 act as bearing surfaces for motion of plate 18 relative to the springs. Springs 22 and 23 have such compression as to allow the coupler to transmit the torque required without permitting plate 18 from lifting off of coupling edges 16 and 17. In other words, as long as the torque transmitted is less than that necessary to lift plate 18 away from a line contact with the coupling edges, the edges will be maintained mutually parallel and the position of one shaft will be transmitted identically to the other shaft. When the torque transmitted rises above this level, the pressure of the springs will be overcome and the torque transmitted at that point will become a function of the mechanical layout involving the spring pressure. This will tend to limit the torque transmitted until the plate 18 is driven against one of the screws 24 or 25.

In transmitting rotary motion when shafts 12 and 13 are misaligned, it is easy to see that edges 16 and 17 will slide on plate 18 as will washers 20 and 21. There will also be a rotary motion of the edges relative to plate 18. As a consequence, coupling edges 16 and 17 should be made of material resistant to rubbing wear, as well as plate 18.

Figure 2:
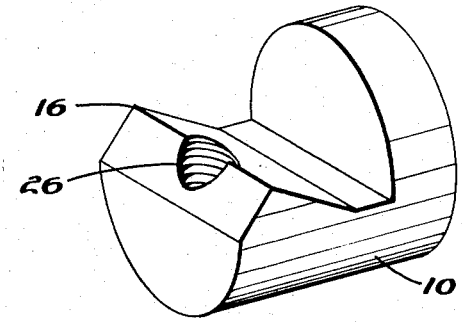
Figure 2 shows one of the driving hubs.

Figure 2 shows hub 10 turned around so that the knife edge 16 can be seen more easily. Hubs 10 and 11 are substantially identical. One thing not visible in Figure 1 is the screw hole 26 which receives screw 24. The screw is usually considerably smaller than the hole in coupling plate 18, sufficiently so to permit unrestrained motion therebetween in operation.

Edge 16 may be the result of a prismatic volume as noted before or may be a surface of a cylinder or some other form if desired. It is preferable, however, to have the prismatic surfaces resulting in an edge so that the line contact with the coupling plate does not vary, which would introduce a variation of transfer linearity. Edge 16 may be rounded slightly without appreciable loss of performance but with a considerable amelioration of the wear problem. The slight roundings of edge 16 lowers the amount of wear of coupling plate 18 and will permit use of materials desirable for other characteristics which would otherwise wear too quickly for satisfactory use in equipment. Edge 16 must be straight in the direction perpendicular to the shaft axis. Of course, if friction is too large a problem, other types of bearings may be used such as, e. g., a ball on each side of hole 26, or a roller on each side of hole 26, mounted and providing the usual antifriction function as is common in the art.

Of course, any or all of the parts in this device may be made from commonly available materials such as plastic, ceramics, or other material. Manufacture of hubs 10 and 11 as well as plate 18 of an insulating material would make the insulation value of the coupler for isolation of the two shafts coupled much greater. Present working models of the coupler using stainless steel for the hubs and washers and phosphor bronze for the transfer plate or bar 18 have shown excellent performance and resistance to wear.

Although this invention has been described with respect to particular embodiments thereof, it is not to be so limited because changes and modifications may be made therein which are within the full intended scope of the invention as defined by the appended claims.

I claim:

1. A universal joint coupler comprising a pair of hubs, each hub having shaft mounting means and a transverse edge, a coupling plate having at least one planar surface, and spring means on each hub to hold said plate surface against each of said edges.

2. Shaft coupling means comprising a first hub adapted to mount on a shaft and having an elongated portion, said elongated portion having a coupling edge transverse to the axis of said shaft, a second hub similar to said first hub, a coupling plate having at least one flat surface, elastic means on each hub, each of said elastic means applying pressure on said coupling plate so that said flat surface is maintained in contact with each of said coupling edges.

3. A universal joint coupler for coupling two misaligned shafts with substantially no backlash comprising a first hub having means to attach said hub to a first shaft, said hub having also an elongated portion extending away from said attachment means, said elongated portion carrying a prismatic portion presenting an edge transverse to the axis of said shaft, said edge being located adjacent the axis of said shaft and substantially perpendicular thereto, a second hub similar to said first hub mounted on a second shaft, a transfer plate having substantially parallel plane surfaces and perforations in each end transverse to said surfaces, first and second screw means intersecting said edges and substantially perpendicular thereto in said first and second hubs, first and second washers, first and second springs, said first and second screw means passing through said springs, said washers and said perforations in said plates into each of said hubs whereby said transfer plate is held between said washers and said edges.

4. The coupling of claim 3 wherein said transfer plate consists of an insulating material.

References Cited in the file of this patent
UNITED STATES PATENTS
2,158,100    Barrett _____ May 16, 1939